US012693396B2

(12) United States Patent
Fuleshwar Prasad et al.

(10) Patent No.: US 12,693,396 B2
(45) Date of Patent: Jul. 28, 2026

(54) SYSTEM AND METHOD FOR DYNAMIC PAIRING BETWEEN DEVICES

(71) Applicant: BlackBerry Limited, Waterloo (CA)

(72) Inventors: Mahendra Fuleshwar Prasad, Waterloo (CA); Scott Leonard Dill, Paris (CA); Adam Paul Jocksch, Waterloo (CA); Steven Joseph MacDonald, Waterloo (CA); Mark Edward Reaume, Wateroo (CA); Jason Wayne Jantzi, St. Clements (CA); Ying Tong Man, Waterloo (CA); Yu Gao, Waterloo (CA)

(73) Assignee: BlackBerry Limited, Waterloo (CA)

( * ) Notice: Subject to any disclaimer, the term of this patent is extended or adjusted under 35 U.S.C. 154(b) by 304 days.

(21) Appl. No.: 18/393,839

(22) Filed: Dec. 22, 2023

(65) Prior Publication Data

US 2025/0208279 A1 Jun. 26, 2025

(51) Int. Cl.
*G01S 11/02* (2010.01)
*G06Q 10/0833* (2023.01)

(52) U.S. Cl.
CPC .......... *G01S 11/02* (2013.01); *G06Q 10/0833* (2013.01)

(58) Field of Classification Search
CPC ...... G01S 11/02; G01S 5/0284; G01S 5/0027; G01S 19/14; G01S 19/34; G01S 2205/001; G01S 5/017; G06Q 10/0833; G06Q 10/063; G06Q 10/08; G06Q 50/40; H04W 4/023; H04W 4/027; H04W 4/029; H04W 4/35; H04W 4/80
See application file for complete search history.

(56) References Cited

U.S. PATENT DOCUMENTS

| | | | | |
|---|---|---|---|---|
| 8,760,274 | B2 * | 6/2014 | Boling ..................... | G08G 1/20 |
| | | | | 340/933 |
| 10,173,486 | B1 | 1/2019 | Lee et al. | |
| 10,902,723 | B2 * | 1/2021 | Doyle, III ................ | G08G 1/20 |
| 11,856,497 | B2 * | 12/2023 | Ossin ...................... | B60R 25/32 |
| 2008/0146262 | A1 * | 6/2008 | Schwoerer ............ | G01S 5/0289 |
| | | | | 455/500 |

(Continued)

FOREIGN PATENT DOCUMENTS

| | | |
|---|---|---|
| CN | 110383351 | 10/2019 |
| CN | 113686331 | 11/2021 |
| JP | 2003228789 | 8/2003 |

OTHER PUBLICATIONS

European Extended Search Report; Application No. 24211927.9; Apr. 8, 2025; 9 pages.

*Primary Examiner* — Yonghong Li

(74) *Attorney, Agent, or Firm* — Conley Rose, P.C.; J. Robert Brown, Jr.

(57) ABSTRACT

A method for dynamic pairing between asset tracking devices, such as a chassis module and a chassis sensor module mounted on a chassis and a container module mounted on a container. The method includes detecting presence of the container using the chassis sensor module and in response, broadcasting a short-range polling signal; establishing a wireless connection with the container module in response to the short-range polling signal; obtaining GNSS data; determining an estimated distance between the chassis module and the container module; and transmitting the GNSS data and the estimated distance to a remote server.

20 Claims, 8 Drawing Sheets

(56)     References Cited

U.S. PATENT DOCUMENTS

| | | | |
|---|---|---|---|
| 2010/0085215 A1 | 4/2010 | Doyle, III | |
| 2011/0010005 A1* | 1/2011 | Tan | B66C 13/46 |
| | | | 702/56 |
| 2015/0241223 A1* | 8/2015 | Davidson | G01C 21/3837 |
| | | | 701/532 |
| 2018/0025603 A1* | 1/2018 | Tyler | H04W 52/0212 |
| | | | 340/572.1 |
| 2018/0060809 A1* | 3/2018 | Seaman | H04W 4/023 |
| 2021/0160327 A1* | 5/2021 | Jantzi | H04L 67/12 |
| 2023/0112513 A1 | 4/2023 | Cawse et al. | |
| 2024/0183974 A1* | 6/2024 | Shrestha | G01S 13/75 |

* cited by examiner

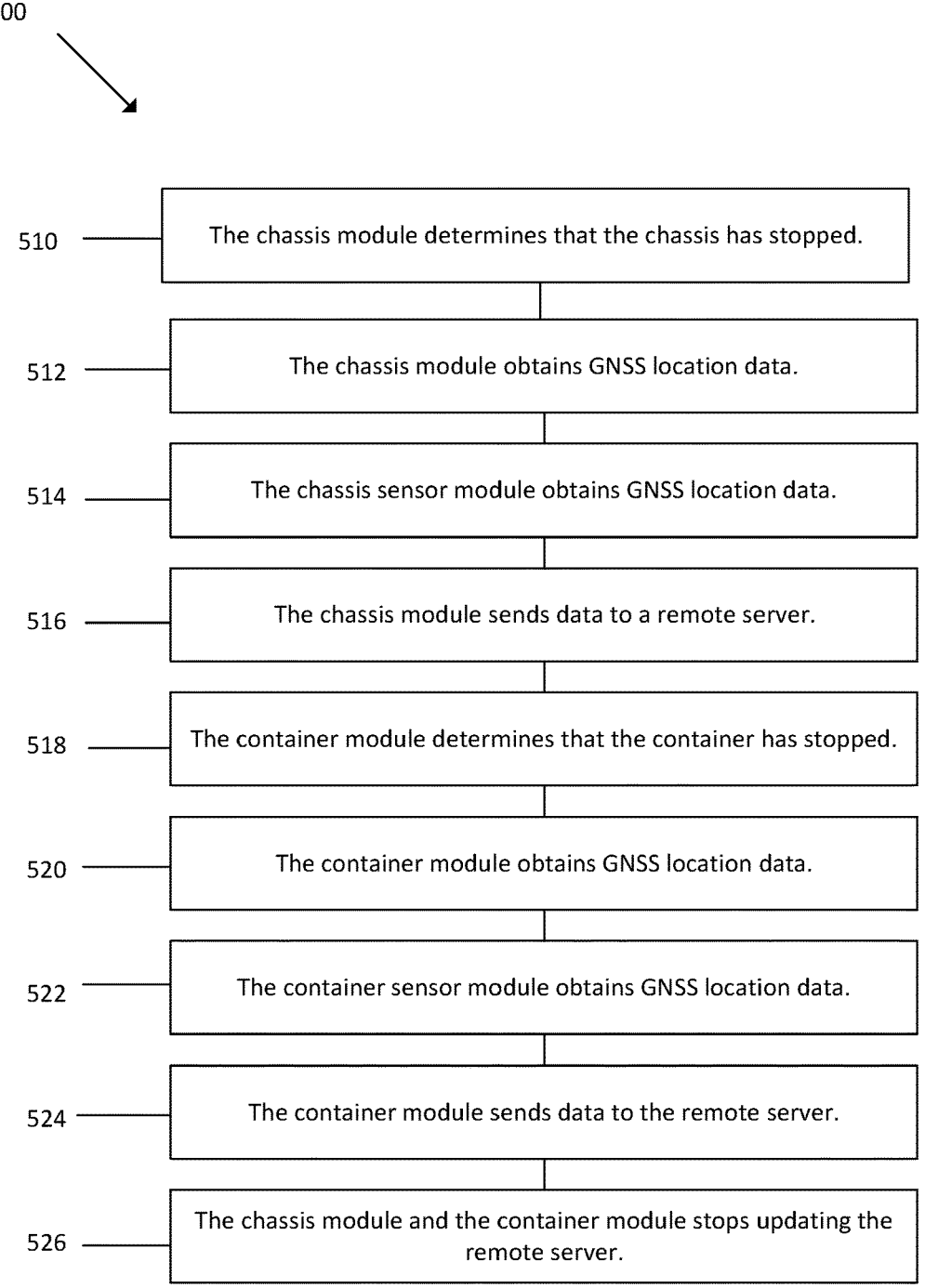

510 —— The chassis module determines that the chassis has stopped.

512 —— The chassis module obtains GNSS location data.

514 —— The chassis sensor module obtains GNSS location data.

516 —— The chassis module sends data to a remote server.

518 —— The container module determines that the container has stopped.

520 —— The container module obtains GNSS location data.

522 —— The container sensor module obtains GNSS location data.

524 —— The container module sends data to the remote server.

526 —— The chassis module and the container module stops updating the remote server.

FIG. 5

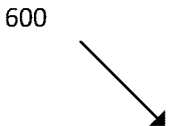

600

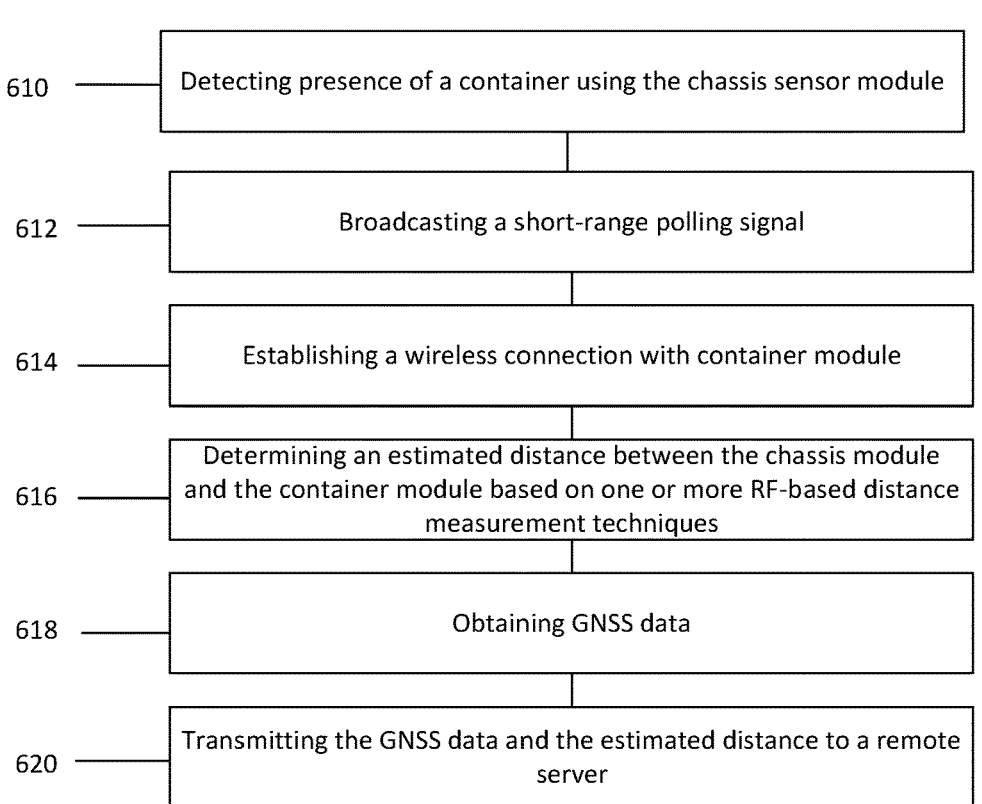

610 — Detecting presence of a container using the chassis sensor module

612 — Broadcasting a short-range polling signal

614 — Establishing a wireless connection with container module

616 — Determining an estimated distance between the chassis module and the container module based on one or more RF-based distance measurement techniques 618 — Obtaining GNSS data 620 — Transmitting the GNSS data and the estimated distance to a remote server

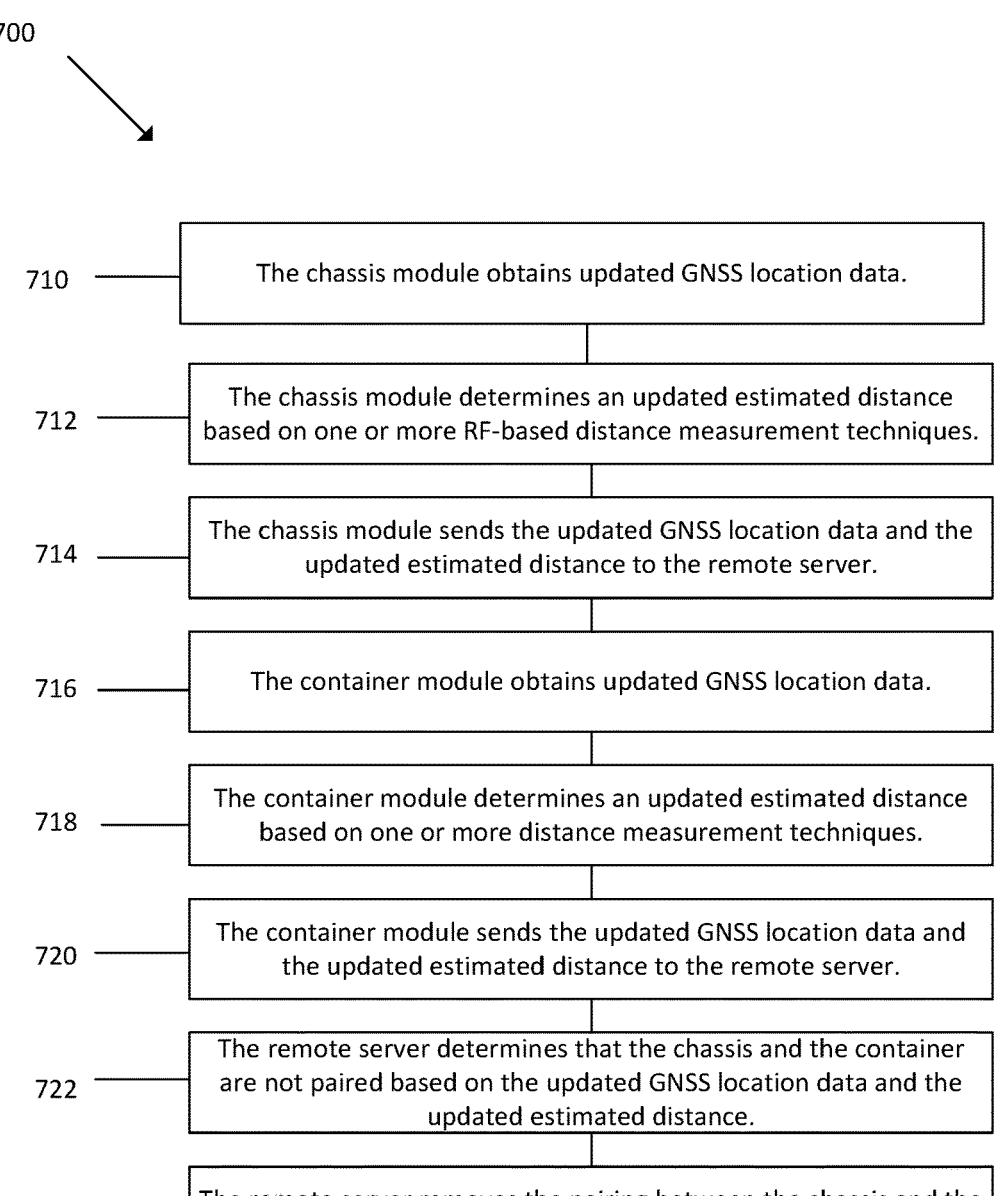

710 — The chassis module obtains updated GNSS location data.

712 — The chassis module determines an updated estimated distance based on one or more RF-based distance measurement techniques.

714 — The chassis module sends the updated GNSS location data and the updated estimated distance to the remote server.

716 — The container module obtains updated GNSS location data.

718 — The container module determines an updated estimated distance based on one or more distance measurement techniques.

720 — The container module sends the updated GNSS location data and the updated estimated distance to the remote server.

722 — The remote server determines that the chassis and the container are not paired based on the updated GNSS location data and the updated estimated distance.

724 — The remote server removes the pairing between the chassis and the container.

FIG. 7

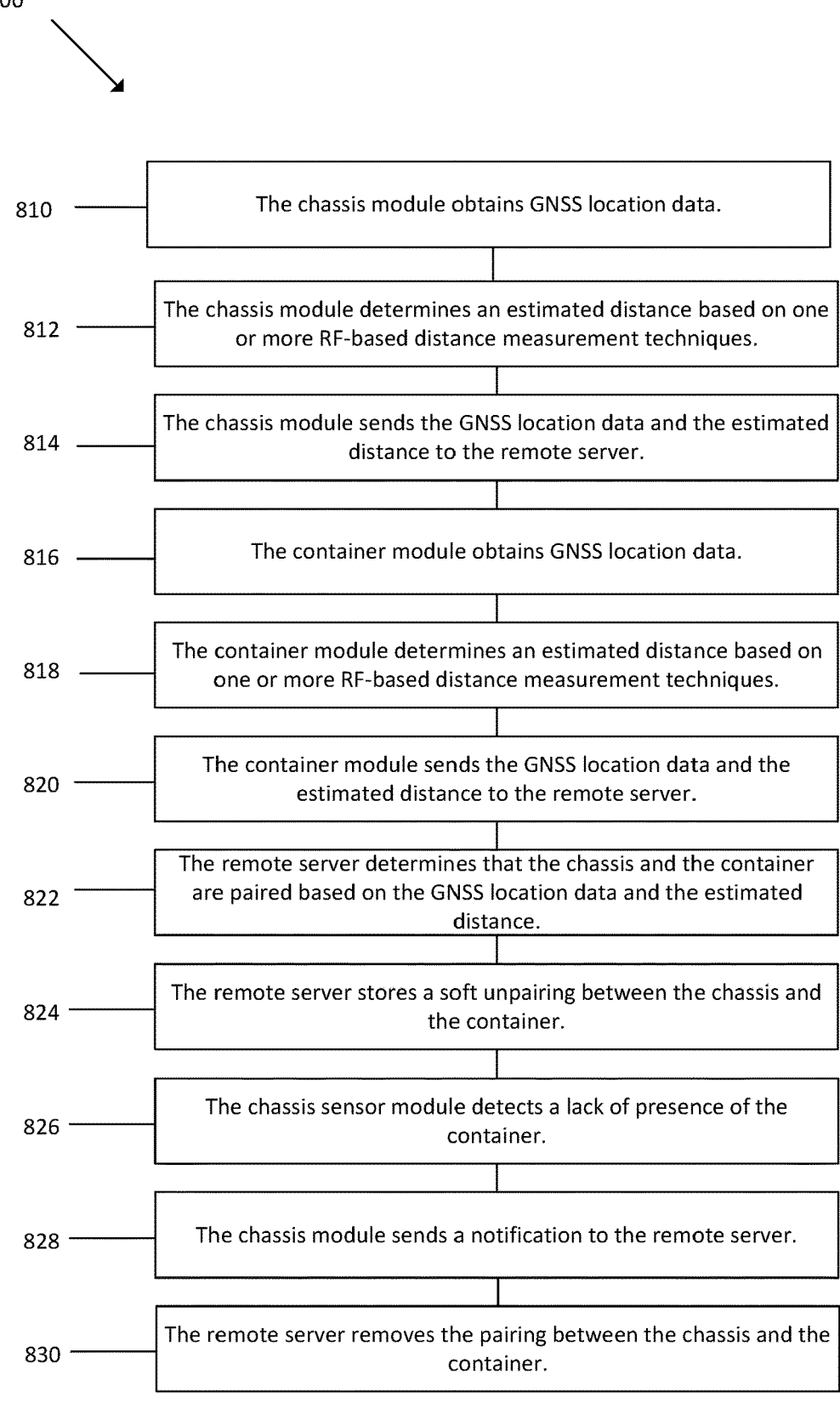

800

810 — The chassis module obtains GNSS location data.

812 — The chassis module determines an estimated distance based on one or more RF-based distance measurement techniques.

814 — The chassis module sends the GNSS location data and the estimated distance to the remote server.

816 — The container module obtains GNSS location data.

818 — The container module determines an estimated distance based on one or more RF-based distance measurement techniques.

820 — The container module sends the GNSS location data and the estimated distance to the remote server.

822 — The remote server determines that the chassis and the container are paired based on the GNSS location data and the estimated distance.

824 — The remote server stores a soft unpairing between the chassis and the container.

826 — The chassis sensor module detects a lack of presence of the container.

828 — The chassis module sends a notification to the remote server.

830 — The remote server removes the pairing between the chassis and the container.

FIG. 8

SYSTEM AND METHOD FOR DYNAMIC PAIRING BETWEEN DEVICES

FIELD

The present application relates to systems and methods for dynamic pairing between devices.

BACKGROUND

The telematics and transportation industry generally desire to improve the visibility of their tractors, trailers, and containers. In particular, they want to know which tractor is hauling which trailer, which chassis is carrying which container, and which tractor is hauling which chassis-container load. Typically, asset tracking devices are powered by the tractor or trailer using physical wires. However, many customers do not prefer this method due to installation and reliability challenges.

BRIEF DESCRIPTION OF THE DRAWINGS

Reference will now be made, by way of example, to the accompanying drawings which show example embodiments of the present application. In the drawings:

FIG. 1 illustrates a simplified diagram of a system using dynamic pairing between asset tracking devices in accordance with an example of the present application.

FIG. 5 shows an illustrative method to initialize the asset tracking devices before performing dynamic pairing.

FIG. 6 shows an illustrative method of dynamic pairing between the asset tracking devices.

FIG. 7 shows an illustrative method to resolve an ambiguity of the dynamic pairing of FIG. 6.

FIG. 8 shows an illustrative method of unpairing between the dynamically paired devices of FIG. 6.

Like reference numerals are used in the drawings to denote like elements and features.

DETAILED DESCRIPTION OF EXAMPLE EMBODIMENTS

Figure 2:
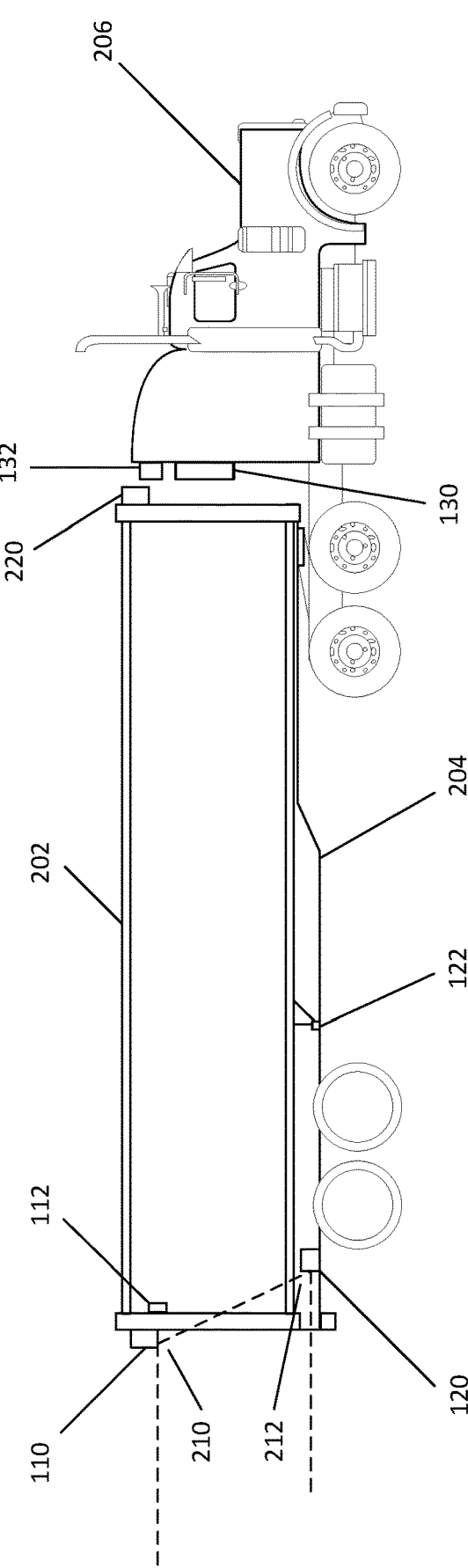
FIG. 2 illustrates dynamic pairing between the asset tracking devices mounted on a truck, chassis, and container of FIG. 1.

In one aspect, the present application describes a method for dynamic pairing between a chassis module and a chassis sensor module mounted on a chassis and a container module mounted on a container, the method comprising: detecting presence of the container using the chassis sensor module and in response, broadcasting a short-range polling signal; establishing a wireless connection with the container module in response to the short-range polling signal; obtaining GNSS data; determining an estimated distance between the chassis module and the container module; and transmitting the GNSS data and the estimated distance to a remote server.

In some implementations, the chassis module and the chassis sensor module are coupled together.

In some implementations, the chassis module and the chassis sensor module are wirelessly connected using short-range communication.

In some implementations, the method includes determining, at the remote server, that the container is mounted to the chassis based on the GNSS data and the estimated distance; and storing a pairing, at the remote server, between the chassis and the container in response to the determination that the container is loaded on the chassis.

In some implementations, the method includes determining that the chassis has stopped; and detecting, in response to having determined that the chassis has stopped, presence of the container using the chassis sensor module.

In some implementations, the method includes sharing sensor data between the chassis module and the chassis sensor module in response to having detected the container using the chassis sensor module.

In some implementations, the method includes obtaining a primary chassis GNSS data in response to having determined that the chassis has stopped; and updating the remote server of the primary chassis GNSS data.

In some implementations, the estimated distance is based on one or more of the GNSS data, short-range radio frequency phase measurement, round-trip timing, and Inverse Fast Fourier Transform.

In some implementations, the wireless connection is based on one or more of a sub-GHz short range link, a Bluetooth low energy short range link, an ultra-wideband short range link, and a millimeter wave short range link.

In some implementations, the estimated distance is based on channel sounding.

In some implementations, the estimated distance is based on direction finding including one or more of an angle of arrival and an angle of departure.

In some implementations, the estimated distance is determined based on sensor data from the chassis sensor module.

In some implementations, the estimated distance is based on a Haversine distance calculation.

In some implementations, the chassis sensor module includes one or more of a millimeter wave sensor, an ultrasonic sensor, a gyroscope, and an accelerometer.

In some implementations, the method includes obtaining updated GNSS data and determining a first estimated distance between the chassis and the container; sending the updated GNSS data and the first estimated distance to the remote server; determining that the container is detached from the chassis based on the updated GNSS data and the first estimated distance at the remote server; and removing the pairing between the container and the chassis in response to the determination that the container is detached from the chassis.

In some implementations, the method includes obtaining the GNSS data of the container, and determining a second estimated distance between the chassis and the container; sending the GNSS data of the container and the second estimated distance to the remote server; and determining that the container is detached from the chassis based on the updated GNSS data, the GNSS data of the container, the first estimated distance, and the second estimated distance at the remote server.

In some implementations, the method includes detecting a lack of presence of the container using the chassis sensor module and in response, sending a notification to the remote server.

In some implementations, the method includes obtaining updated GNSS data of the chassis and a first estimated distance in response to determining that the chassis has stopped; and sending the updated GNSS data, and the first estimated distance to the remote server.

In another aspect, the present application describes a first device for dynamic pairing comprising: a short-range communication module; a long-range communication module; a GNSS module; a sensor module; a processor coupled to the short-range communication module, the long-range communication module, the GNSS module, and the sensor module; a memory coupled to the processor and storing executable instructions which, when executed by the processor, configure the processor to: detect a presence of an asset using the sensor module and in response, broadcasting a short-range polling signal using the short-range communication module; establishing a wireless connection with a second device that is coupled to the asset in response to the short-range polling signal; obtaining GNSS data using the GNSS module; determining an estimated distance between the first device and the second device; and transmitting the GNSS data and the estimated distance to a remote server using the long-range communication module.

In another aspect, the present application describes a non-transitory computer-readable storage medium comprising computer-executable instructions which, when executed, configure a processor to: detect a presence of an asset and in response, broadcasting a short-range polling signal; establishing a wireless connection with a second device coupled to the asset in response to the short-range polling signal; obtaining GNSS data; determining an estimated distance between a first device and the second device; and transmitting the GNSS data and the estimated distance to a remote server.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure relates to asset tracking devices. These asset tracking devices may be attached to shipping containers, chassis (also referred to as trailers), and trucks (also referred to as tractors) for tracking their geographical location. Asset tracking devices typically contain a global navigation satellite system (GNSS) chip or other such hardware for obtaining location data using satellite signals. In some cases, the devices may be configured to use cellular triangulation, Wi-Fi location determination, short range beacon location data, or other such location technologies.

Asset tracking devices typically contain a cellular transceiver that enables them to periodically obtain a data connection over a cellular network and transmit a location report to a remote server. The location report may contain one or more geolocation determinations or geolocation data, timestamps for when the data was obtained, and other such information. The remote server may provide an interface that enables a registered user account having one or more associated tracking devices to log into the remote server to obtain reported information regarding the location or location history of their associated tracking devices.

Telematics and transportation industry customers generally want improved visibility regarding the location of their assets, such as their containers, chassis, and trucks. Typically, asset tracking devices draw power from the chassis or truck using wires which may lead to installation and reliability challenges.

The present application implements a method for dynamic pairing between asset tracking devices mounted on containers, chassis, and trucks. The dynamic pairing uses a distance estimation method based on GNSS location data, short-range radio frequency (RF) phase measurement, and round-trip timing (RTT) and/or Inverse Fast Fourier Transform (IFFT). A sub-GHz short-range link and/or Bluetooth low energy short-range link may be used. The distance estimation method may use channel sounding and direction finding using an angle of arrival (AoA) or angle of departure (AoD). Further the distance estimation method may use a container on-off sensor and/or a truck presence detector, such as a millimeter-wave waveguide or ultrasonic short range object detector and motion detector, such as an accelerometer.

Figure 1:
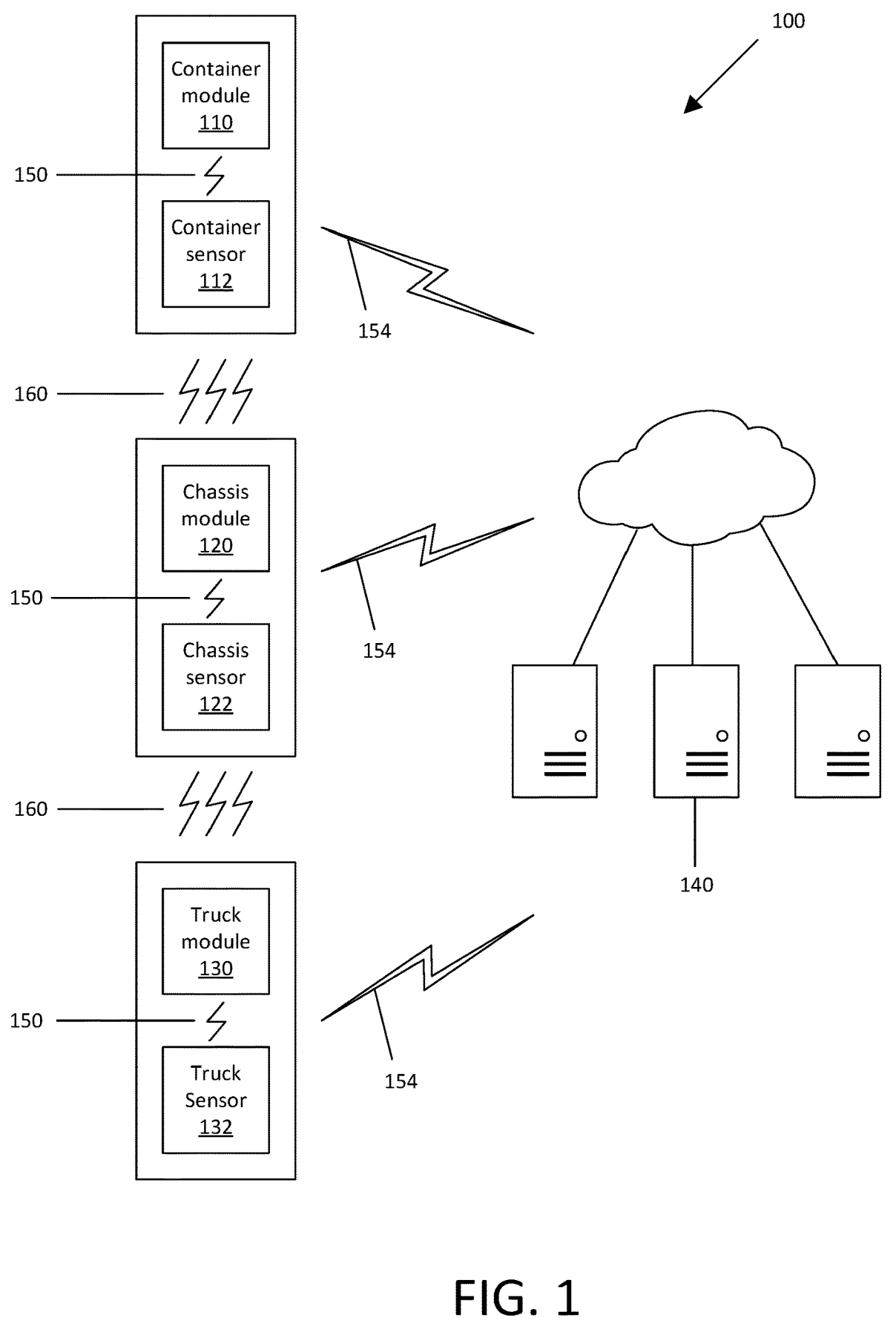

Reference will now be made to FIG. 1, which shows an example of a system 100 for asset tracking using dynamic pairing between devices. The system 100 may include a remote server 140, a container module 110, a container sensor module 112, a chassis module 120, a chassis sensor module 122, a truck module 130, and a truck sensor module 132. The modules may also generally be referred to as asset tracking devices. The modules and sensor modules, as previously mentioned, may include a plurality of sensors, such as a temperature sensor, a humidity sensor, a vibration sensor, or other environmental sensors.

The container module 110 and the container sensor module 112 may be paired using short-range communication 150. Similarly, the chassis module 120 and the chassis sensor module 122 may be paired using short-range communication 150. Similarly, the truck module 130 and the truck sensor module 132 may be paired using short-range communication 150. The sensor modules 112, 122 and 132 may share sensor data with the modules 110, 120, 130, respectively. The sensor data may include information regarding the presence of objects, such as the container and the cargo within the container.

The short-range communication 150 may include a short-range link, such as Bluetooth, Bluetooth low energy (BLE), Wi-Fi, Zigbee, Z-Wave (sub-GHz frequency range) and ultra-wideband (UWB). The short-range communication 150 may further include a short-range network, such as a Personal Area Network (PAN), Radio Frequency Identification (RFID) Network and Wireless Local Area Network (WLAN).

The container module 110 and the container sensor module 112 may be physically coupled together into a single device mounted on a container. Similarly, the chassis module 120 and the chassis sensor module 122 may be physically coupled together as one device mounted on a chassis. Similarly, the truck module 130 and the truck sensor module 132 may be physically coupled together as one device mounted on a truck.

In some cases, the container module 110, the chassis module 120, and the truck module 130 may communicate with each other using a second short-range communication 160. The second short-range communication may have the same characteristics and properties as the short-range communication 150 as described above. In some cases, the container module 110, the container sensor module 112, the chassis module 120, the chassis sensor module 122, the truck module 130, and the truck sensor module 132 may communicate with each other using the second short-range communication 160 which may have similar characteristics and properties to the short-range communication 150 as described above.

The container module 110 may communicate with the remote server 140 using long-range communication 154. Similarly, the chassis module 120 may communicate with the remote server 140 using long-range communication 154. Similarly, the truck module 130 may communicate with the remote server 140 using long-range communication 154. The modules 110, 120, 130 may send location data regarding the chassis, the container, and the truck to the remote server 140. The location data may include Global Navigation Satellite System (GNSS) location data, and estimated distances between the chassis, the container, and the truck.

Reference will now be made to FIG. 2, which shows the asset tracking devices mounted on the container 202, the chassis 204, and the truck 206. The container module 110 and the container sensor module 112 may be mounted on the container 202. The container sensor module 112 may be mounted inside of the container 202. For example, the container module 110 may be mounted on the door of the container 202. The container sensor module 112 may be used to determine whether cargo is loaded in the container 202. The container module 110 and the container sensor module 112 may be in close proximity to facilitate short-range wireless communication. The container module 110 and the container sensor module 112 may be pre-paired using short-range wireless communication during or after the installation of the devices onto the container 202. The container module 110 and the container sensor module 112 may be wirelessly connected via a static short-range frequency network. In some cases, the container module 110 may receive a short range radio frequency signal from the chassis module 120. In some cases, an angle of attack (AoA) 210 may be determined for the short-range radio frequency signal. In some cases, an alternate container module 220 may be placed near the rear of the truck 206 or the front of the container 202.

The chassis module 120 and the chassis sensor module 122 may be mounted on the chassis 204. In some cases, an object detection sensor of the chassis sensor module 122 may be positioned towards the bed of the chassis 204 and/or the base of the container 202. The chassis sensor module 122 may be used to determine whether the container 202 is loaded on the chassis 204. The chassis module 120 and the chassis sensor module 122 may be pre-paired using short-range wireless communication during or after the installation of the devices onto the chassis 204. The chassis module 120 and the chassis sensor module 122 may be wirelessly connected via a static short-range frequency network. In some cases, the chassis sensor module 122 may be used to determine whether the chassis 204 is attached to the truck 206. In some cases, the chassis module 120 may transmit a short range radio frequency signal. In some cases, an angle of departure (AoD) 212 may be determined for the short-range radio frequency signal.

The truck module 130 and the truck sensor module 132 may be mounted on the truck 206. The truck sensor module 132 may be mounted on the rear of the truck 206. The truck sensor module 132 may be used to determine whether the container 202 is mounted on the chassis 204, or whether the chassis 204 is attached to the truck 206.

Figure 3:
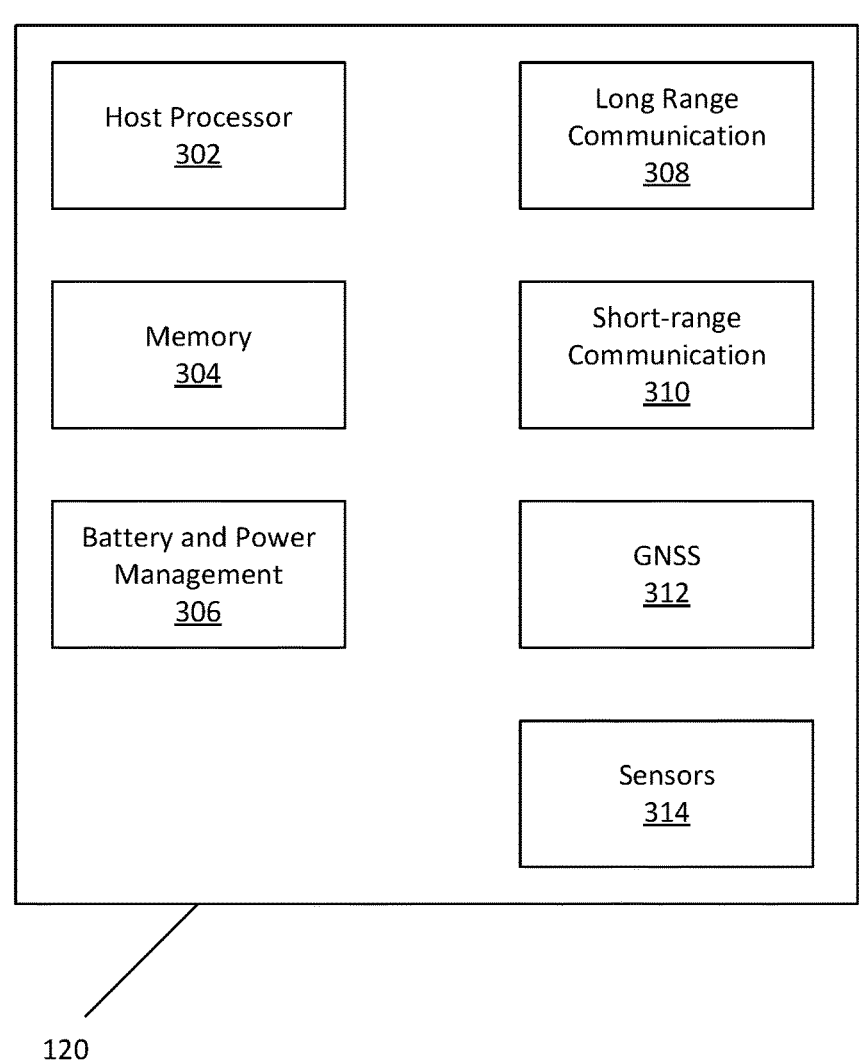
FIG. 3 illustrates a simplified block diagram of the components of a chassis module of FIGS. 1 and 2.

Reference will now be made to FIG. 3, which shows an example of the chassis module 120 of FIGS. 1 and 2. The container module 110 and the truck module 130 of FIGS. 1 and 2 may also have similar components to the chassis module 120 as described. The chassis module 120 may include one or more of a host processor 302, a memory module 304, a battery and power management module 306, a long-range communication module 308, a short-range communication module 310, a GNSS module 312 and sensors 314.

The host processor 302 may be a microprocessor. In some cases, the host processor 302 may be a microcontroller, an application-specific integrated circuit (ASIC), or another processing unit.

The memory module 304 may store executable instructions which, when executed may cause the host processor 302 to perform a plurality of method steps. The memory module 304 may be used to store event data, data log, or sensor data generated by the host processor 302 or the sensors 314. The memory module 304 may permit data to be stored or retrieved. The memory module 304 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system.

The battery and power management module 306 may include one or more batteries to power the chassis module 120. The battery may be rechargeable or replaceable in some implementations. The battery and power management module 306 may include battery charging circuitry (not shown) to receive charge from an external power source.

The long-range communication module 308 may allow the chassis module 120 to communicate with other electronic devices and/or various communications networks. For example, the long-range communication module 308 may allow the chassis module 120 to send or receive communications signals. Communication signals may be sent or received according to one or more protocols or according to one or more standards. For example, the long-range communication module 308 may allow the chassis module 120 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the long-range communication module 308 may allow the chassis module 120 to communicate using near-field communication (NFC), via Wi-Fi, using Bluetooth or via some combination of one or more networks or protocols.

In some cases, the container module 110, the chassis module 120, or the truck module 130 of FIGS. 1 and 2 may not include the long-range communication module 308. For example, the chassis module 120 may rely on the long-range communication module of the truck module 130 or the container module. In some cases, the container module 110 may not transmit its GNSS location data over long-range communication until the container module 110 is paired.

The short-range communication module 310 may include one or more short-range communications technologies, such as Wi-Fi, Bluetooth, Bluetooth low energy (BLE), low-power wide-area network (LPWAN) technology, or other such technologies. In some cases, the short-range communication module 310 may be used by the chassis module 120 to connect with and exchange communications with a nearby sensor unit or other peripheral related to the chassis module 120.

The GNSS module 312 may receive location data from a plurality of satellites. The GNSS module 312 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS module 312 may be configured to determine the geographic location of the chassis module 120, based on received satellite signals from three or more satellites, and output a set of geographic coordinates representing the geolocation of the chassis module 120.

In some cases, the container module 110, the chassis module 120, or the truck module 130 of FIGS. 1 and 2 may not include the GNSS module. For example, the chassis module 120 may rely on the GNSS module or location data of the container module 110 or the truck module 130.

The chassis module 120 in this example may include one or more sensors 314. The one or more sensors 314 may include environmental sensors, such as accelerometers, gyroscopes, temperature sensors, humidity sensors, dust sensors, chemical sensors, etc.

Figure 4:
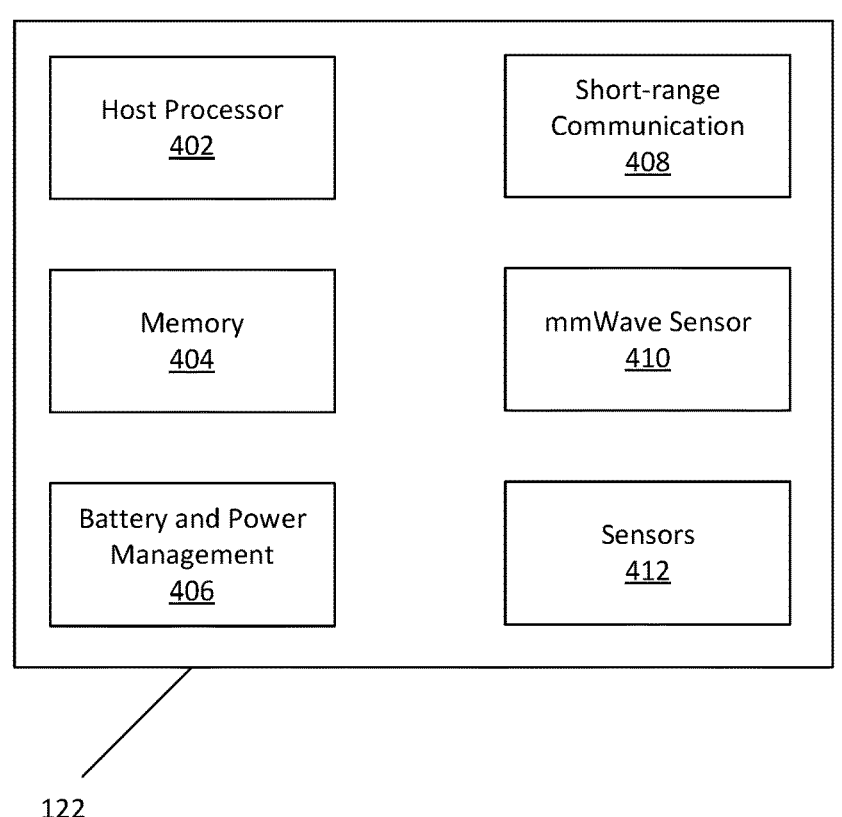
FIG. 4 illustrates a simplified block diagram of the components of a chassis sensor module of FIGS. 1 and 2.

Reference will now be made to FIG. 4, which shows an example of the chassis sensor module 122 of FIGS. 1 and 2. The container sensor module 112 and truck sensor module 132 of FIGS. 1 and 2 and may also have similar components as the chassis sensor module 122 as described.

The chassis sensor module 122 may include a sensor processor 402. The sensor processor 402 may be a micro-processor. In some cases, the sensor processor 402 may be a microcontroller, an applicant-specific integrated circuit (ASIC), or another processing unit.

The chassis sensor module 122 may include the sensor memory module 404. The sensor memory module 404 may store executable instructions which, when executed may cause the sensor processor 402 to perform a plurality of method steps. The sensor memory module 404 may be used to store event data, data log, or sensor data generated by the sensor processor 402 or the other sensors 412. The sensor memory module 404 allows data to be stored or retrieved. The sensor memory module 404 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system.

The chassis sensor module 122 may include a sensor battery and power management module 406. The sensor battery and power management module 406 may include one or more batteries to power the chassis module 120. The battery may be rechargeable or replaceable in some implementations, and the sensor battery and power management module 406 may further include battery charging circuitry (not shown) to receive charge from an external power source.

The chassis sensor module 122 may include a sensor short-range communication module 408. The sensor short-range communication module 408 may include one or more short-range communications technologies, such as Wi-Fi, Bluetooth, Bluetooth low energy (BLE), low-power wide-area network (LPWAN) technology, or other such technologies. In some cases, the sensor short-range communication module 408 may be used by the chassis sensor module 122 to connect with and exchange communications the chassis module 120. For example, chassis sensor module 122 may provide sensor data to the chassis module 120 via the sensor short-range communication module 408.

The chassis sensor module 122 may include a millimeter-wave waveguide 410 (also known or referred to as a millimeter waveguide, mmWave waveguide, or waveguide). The millimeter-wave waveguide 410 may also be waveguide of any type, such as, a rectangular waveguide, a circular waveguide, a double-ridged waveguide, a corrugated wave-guide, a slotted waveguide, a tapered waveguide, a dielec-tric-loaded waveguide, and an integrated waveguide. The millimeter-wave waveguide 410 may be used to determine whether the container is loaded on the chassis.

The chassis sensor module 122 in this example may include one or more sensors 412. The one or more sensors 412 may include environmental sensors, such as accelerom-eters, gyroscopes, temperature sensors, humidity sensors, dust sensors, chemical sensors, etc. In some cases, the one or more sensors 412 may include load-detection sensors for determining whether a container is loaded on a chassis. Load-detection sensors may include a millimeter wave radar sensor, a range detector, a strain gauge, a switch, a laser, a Hall effect sensor, a Time-of-Flight sensor, a Reid switch, etc.

Reference will now be made to FIG. 5, which shows an initialization method 500 to initialize the asset tracking devices before dynamic pairing. In this example, the chassis module may be mounted to the chassis. The chassis sensor module may also be mounted on the chassis. The chassis module may be mounted in close proximity to the chassis sensor module. The chassis sensor module may include a container detection sensor. The container detection sensor may be used to determine whether the container is loaded on the chassis. The container detection sensor may be a mmWave sensor, or an ultrasonic sensor.

In operation 510, the chassis module may determine that the chassis has stopped moving. For example, the chassis is transported to a railyard where it may receive the container. The chassis may be stationary in the railyard. The container module and the container sensor module may be mounted to the container.

In operation 512, the chassis module may obtain GNSS location data in response to the chassis being stationary. The GNSS location data may achieve submeter level GNSS accuracy. The duration of the GNSS location data varies depending on the level of accuracy. In some cases, the chassis module may periodically wake up every 7 minutes to obtain GNSS location data.

In operation 514, optionally, the chassis sensor module may obtain GNSS location data. Optionally, the chassis sensor module may also be acquiring GNSS location data for a more accurate location of the chassis. For example, the chassis sensor module may be acquiring an GNSS location every 4 hours or 24 hours after the chassis sensor module has determined that the chassis has stopped moving.

In operation 516, the chassis module may send the GNSS location data of the chassis module and the chassis sensor module to the remote server. The GNSS location of the chassis may be logged by the remote server.

In some cases, the chassis module may not include the long-range communication module using cellular data and thus, may not send the GNSS location of the chassis module to the remote server.

In operation 518, the container module may determine that the container has stopped moving. For example, a railcar carrying the container may have stopped in the railyard and thereafter, the container may be offloaded from the railcar onto the chassis.

In operation 520, similar to the chassis module, the container module may obtain GNSS location data. The GNSS location data may achieve submeter level GNSS accuracy. The duration of the GNSS location data varies depending on the level of accuracy. For example, the container module may periodically wake up every 7 minutes to obtain GNSS location data.

In operation 522, optionally, similar to the chassis sensor module, the container sensor module may obtain GNSS location data. The container sensor module may also be acquiring GNSS location data for a more accurate location of the container. For example, the container sensor module may be acquiring GNSS location every 4 hours or 24 hours after the container sensor module has determined that the container has stopped moving.

In operation 524, the container module may send the GNSS location data of the container module and/or the container sensor module to the remote server. The GNSS location of the container may be logged by the remote server.

In some cases, the container module may not include the long-range communication module and thus, may not send the GNSS location of the container module to the remote server.

In operation 526, the chassis module and the container module may stop updating the remote server until further movement of the chassis or the container is detected.

In an alternative embodiment, dynamic pairing may occur between the chassis module and the truck module. In this case, the chassis module and the truck module may perform similar initialization steps as the chassis module and the container module as described above.

In an alternative embodiment, dynamic pairing may occur between the container module and the truck module. In this case, the container module and the truck module may perform similar initialization steps as the chassis module and the container module as described above.

In an alternative embodiment, dynamic pairing may occur between the chassis module, the container module, and the truck module. In this case, the three modules may perform similar initialization steps as the chassis module and the container module as described above. The remote server may log the GNSS location of the three modules.

Reference will now be made to FIG. 6, which shows an illustrative method of dynamic pairing 600 between the devices. For example, dynamic pairing may occur between the chassis module and the container module, the chassis module and the truck module, the truck module and the container module, and between the container module, the chassis module and the truck module. In particular, the method below shows dynamic pairing 600 between the chassis and the container. Dynamic pairing 600 may pair one chassis with one container. Dynamic pairing 600 may be challenging as there may be a plurality of containers near a plurality of chassis, for example, in the railyard. As a result, a container may be incorrectly paired with a chassis.

In operation 610, the chassis sensor module may be continuously or intermittently detecting for the presence of a container. The chassis sensor module may provide sensor data to the chassis module. For example, the chassis sensor module may provide a signal to the chassis module indicating that the container is loaded onto the chassis. A chassis sensor module may be using an object detection sensor to generate the signal.

In operation 612, in response to having detected that the container is loaded onto the chassis, the chassis module may broadcast a short-range polling signal for a short-range radio frequency link or network. The short-range polling signal may be detectable by a plurality of container modules, a plurality of chassis modules and a plurality of truck modules in close proximity.

In operation 614, the chassis module may be establishing a wireless connection with the container module such as the short-range radio frequency link or network. Put differently, the chassis module and the container module may be wirelessly connected via Bluetooth or Bluetooth low energy. In some cases, the container module may be periodically scanning for the short-range polling signal so that it can be part of the short-range radio frequency network. For example, scanning may occur every minute, 5 minutes, or 15 minutes. In an alternative embodiment, the chassis module may be establishing a wireless connection with the truck module by the short-range radio frequency link or network.

In operation 616, the chassis module may determine an estimated distance between the chassis module and the container module. In some cases, the estimated distance may be determined between the chassis module and the other devices connected on the short-range frequency network. For example, if the container module, the container sensor module, the chassis module, the chassis sensor module, the truck module and the truck sensor module are all connected on the same short-range radio frequency network, the chassis module may calculate the estimated distance between each of the other devices. In some cases, the estimated distances between each of the modules may be shared between the devices on the short-range radio frequency network.

The estimated distance may be based on short-range radio frequency phase measurement. The estimated distance may be based on round-trip timing (RTT). The estimated distance may be based on the Inverse Fast Fourier Transform (IFFT). The estimated distance may be based on channel sounding. The estimated distance may be based on direction finding using the angle of arrival (AoA) and angle of departure (AoD). For example, the estimated distance may be based on direction finding using the AoA 210 of the container module and the AoD 212 of the chassis module as shown in FIG. 2. The estimated distance may be based on sensor data. The sensor data may be from the chassis module, the chassis sensor module, the container module, and the container sensor module. The estimated distance may be based on a Haversine distance calculation.

In operation 618, the chassis module may obtain GNSS location data. In some cases, the container module may obtain GNSS location data. In some cases, the container module may provide the GNSS location of the container to the chassis module. Put differently, only one of the modules may need to obtain GNSS location data. In some cases, the truck module may provide the GNSS location of the truck to the chassis module.

In an alternative embodiment, the chassis module may receive GNSS location data from multiple devices, for example, the chassis sensor module, the container sensor module, the truck module, and/or the truck sensor module.

In operation 620, the chassis module may transmit the GNSS data of the chassis module and the estimated distance to the remote server. The estimated distance may be the distance between the chassis module and the container module. In some cases, the chassis module may transmit the GNSS data of the container module to the remote server. In some cases, the chassis module may transmit the sensor data to the remote server. In some cases, the chassis module may transmit the GNSS data of the truck module to the remote server.

In some cases, the container module may transmit the GNSS data of the container and the estimated distance between the container and the chassis to the remote server.

In some cases, the chassis module may not include the long-range communication module. In some cases, the chassis module may not send the GNSS data of the chassis module and the estimated distance to the remote server. In some cases, the chassis module may rely on the container module or the truck module to send the GNSS data and the estimated distance(s) to the remote server.

In some cases, the chassis module may disable the long-range communication module before the wireless connection is established between the chassis module and the container module or the truck module. In response to establishing the wireless connection, the chassis module may turn on the long-range communication module.

In an alternative embodiment, the chassis module may send the GNSS location data of the chassis module, the chassis sensor module, the container module, and the container sensor module to the remote server.

In some cases, the chassis module may send the estimated distances between the chassis module and each of the other modules, such as the chassis sensor module, the container sensor module, the truck module, and the truck sensor module to the remote server.

In some cases, the remote server may perform a distance measurement among the modules based on the GNSS location data. The remote server may filter out all the modules based on the GNSS location data and the estimated distance(s). The remote server may filter out the sensor modules and only pair the modules 110, 120 and 130 together.

In some cases, the remote server may update a dashboard in response to the dynamic pairing between the chassis module and the container module. In response to the updated dashboard, an alert notification may be provided. The dashboard may provide a method to trigger direction finding (AoA/AoD) to resolve ambiguity wakeup if the remote server is not able to resolve the pairing ambiguity.

In some cases, the remote server may push the geographical location of the chassis module to container module. Thereafter, the container module can program a geofence radius, for example, of less than one meter, to automatically calculate the presence of the container module in the chassis module localized geofence (by the GNSS module) of the mounted container and chassis.

In some cases, the remote server may use altitude sensor data to filter out unrelated chassis, container modules and truck modules.

In an alternative embodiment, dynamic pairing may occur between the chassis module and the truck module. In this case, the truck module may perform steps similar to the method steps as described above by the chassis module. For example, the truck sensor module may be used to determine whether the container is loaded onto the chassis. In response, the truck sensor module may provide a signal to the truck module or the chassis module indicating that the container has been loaded onto the chassis. In response to the signal, the truck module may obtain GNSS location data of the truck module and calculate the estimated distance between the chassis module and the truck module. Furthermore, the truck module may provide the remote server with the GNSS location data of the truck module and the estimated distance between the chassis module and the truck module. In response to receiving the GNSS location data and the estimated distance, the remote server may determine whether the chassis module and the truck module are attached together. In response to the determination that the chassis and truck are attached together, the remote server may store a pairing between the chassis module and the truck module. In some cases, the remote server may use the GNSS location data and the estimated distances provided by both the chassis module and the truck module to determine whether the chassis and the truck are attached together.

In an alternative embodiment, dynamic pairing may occur between the container module and the truck module. In this case, the truck module may perform steps similar to the method steps as described above by the chassis module. For example, the truck sensor module may be used to determine whether the container is loaded onto the chassis. In response, the truck sensor module may provide a signal to the truck module indicating that the container has been loaded onto the chassis. In some cases, the truck sensor module may provide a signal indicating that the container is near the rear of the truck. In response to the signal, the truck module may obtain GNSS location data of the truck module and calculate the estimated distance between the container module and the truck module. Furthermore, the truck module may provide the remote server with the GNSS location data of the truck module and the estimated distance between the container module and the truck module. In response to the determination that the container and the truck are attached, coupled, or linked together, the remote server may store a pairing between the container module and the truck module. In some cases, the remote server may use the GNSS location data and the estimated distances provided by both the container module and the truck module to determine whether the container and the truck are attached together.

In an alternative embodiment, dynamic pairing may occur between the chassis module, the container module, and the truck module. In this case, the chassis sensor module and the truck sensor module may both provide sensor data regarding whether the container is loaded on the chassis. In response to receiving the sensor data via short-range communication, the chassis module, container module, and/or truck module may obtain GNSS location data and determine the estimated distances between each of the devices. Thereafter, the chassis module may send to the remote server the GNSS location data of the devices and the estimated distances between each of the devices. In response to receiving the GNSS location data of the devices and the estimated distances between each of the devices, the remote server may determine that the devices are attached together. In response to the determination, the remote server may store a pairing between chassis, the container, and the truck.

Reference will now be made to FIG. 7, which shows an ambiguity resolution method 700 which attempts to resolve an ambiguity of dynamic pairing between the asset tracking devices. For example, an ambiguity may arise when the chassis is incorrectly paired with the container in the remote server. The ambiguity resolution method 700 may be executed when the chassis module and/or the container module has stopped moving or periodically, for example, every 15 minutes or 4 hours, depending on the motion of the modules.

In operation 710, the chassis module may obtain updated GNSS location data. The chassis module may obtain the updated GNSS location data in response to having detected that the chassis has stopped moving.

In operation 712, the chassis module may determine an updated estimated distance between the chassis module and the container module.

In operation 714, the chassis module may send the updated GNSS location of the chassis and the updated estimated distance between the chassis and the container to the remote server. The chassis module may provide direction data of the chassis module to the remote server.

In operation 716, the container module may obtain updated GNSS location data. The container module may obtain updated GNSS location data in response to having detected that the container has stopped moving.

In operation 718, the container module may determine or calculate an updated estimated distance between the chassis module and the container module.

In operation 720, the container module may send the updated GNSS location of the container and the updated estimated distance between the chassis and the container to the remote server. The container module may send direction data of the container module to the remote server.

In operation 722, the remote server may determine that the container is not loaded on the chassis based on the updated GNSS data and the updated estimated distance. In addition, the server may determine the container is not loaded on the chassis based on the direction data from the chassis and container module. In some cases, the remote server may use direction sensor data to determine whether the container is not loaded on the chassis.

In operation 724, the remote server removes the pairing between the chassis and the container. In some cases, the remote server may update the dashboard to display the latest pairing status of the chassis and the module. In some cases, the remote server may generate a critical alarm based on the status of the pairing. For example, if the dynamic pairing is incorrect, the remote server may generate the critical alarm to the dashboard.

In an alternative embodiment, dynamic pairing may have occurred between the chassis module and the truck module. The chassis module and the truck module may perform similar method steps as the chassis module and the container module as described above.

In an alternative embodiment, dynamic pairing may have occurred between the container module and the truck module. The container module and the truck module may perform similar method steps as the chassis module and the container module as described above.

In an alternative embodiment, dynamic pairing may have occurred between the chassis module, the container module, and the truck module. The modules may perform similar method steps as the chassis module or the container module as described above.

Reference will now be made to FIG. 8, which shows an illustrative method of dynamic unpairing 800 between the devices. For example, dynamic unpairing 800 may occur when the container is unloaded from the chassis. The dynamic unpairing 800 may occur when the chassis module and/or the container module stops moving or in other words, transitions from motion to stop.

In operation 810, the chassis module may obtain updated GNSS location data. The chassis module may obtain the updated GNSS location data in response to having detected that the chassis has stopped moving.

In operation 812, the chassis module may determine or calculate an updated estimated distance between the chassis module and the container module.

In operation 814, the chassis module may send the updated GNSS location of the chassis and the updated estimated distance between the chassis and the container.

In operation 816, the container module may obtain updated GNSS location data. The container module may obtain updated GNSS location data in response to having detected that the container has stopped moving.

In operation 818, the container module may determine or calculate an updated estimated distance between the chassis module and the container module.

In operation 820, the container module may send the updated GNSS location of the container and the updated estimated distance between the chassis and the container to the remote server.

In operation 822, the remote server may determine that the container remains loaded on the chassis based on the updated GNSS data and the updated estimated distance. The remote server may publish a temporary status of the chassis and container pairing to the dashboard.

In operation 824, the remote server stores a soft pairing between the chassis and the container. The soft pairing may mean that the chassis and the container will be decoupled in a short period of time. In other words, the soft pairing may mean the container will be unloaded from the chassis soon.

In operation 826, the chassis sensor module may detect a lack of presence of the container loaded on the chassis. The chassis sensor module may provide a wireless signal indicating that the container is unloaded from the chassis to the chassis module. The chassis module may obtain updated GNSS location data in response to receiving the wireless signal and determine an updated estimated distance. The container module may obtain updated GNSS location data in response to receiving the wireless signal from the chassis module and determine an updated estimated distance.

In operation 828, in response to having detected the lack of presence of the container loaded on the chassis, the chassis module may send a notification to the remote server indicating that the container has been unloaded from the chassis.

In operation 830, in response to the notification, the remote server may remove the pairing between the chassis and the container. In some cases, in response to the unpairing status, the remote server may send a signal or an update to the container module indicating that the container is unpaired with the chassis module. In response to receiving the signal or the update, the container module may start scanning for a new polling signal to establish a new wireless connection with a new container module. Put differently, the container module may return to the initial state before being dynamically paired with the chassis module.

In some cases, in response to the unpairing status, the remote server may send a signal or an update to the chassis module indicating that the chassis is unpaired with the container module. In response to receiving the signal or the update, the chassis module may provide a new polling signal.

In an alternative embodiment, the chassis module and the truck module may have been dynamically paired and the pairing may have been stored on the remote server. For unpairing, the chassis module and the truck module may perform similar method steps as the chassis module and the container module as described above. In some cases, the truck module and the truck sensor module may provide a further signal indicating that the container has been unloaded from the chassis to the remote server. In response to receiving the signal, the pairing may be removed by the remote server.

In an alternative embodiment, the container module and the truck module may have been dynamically paired and the pairing may have been stored on the remote server. For unpairing, the container module and the truck module may perform similar method steps as the chassis module and the container module as described above. In some cases, the truck module and the truck sensor module may provide a further signal indicating the container has been unloaded from the chassis to the remote server. In response, the pairing may be removed by the remote server.

In an alternative embodiment, the chassis module, the container module, and the truck module may be dynamically paired, and the pairing may be stored on the remote server. For unpairing between the devices, the truck module and the truck sensor module may provide a further signal indicating that the container is unloaded from the chassis. In some cases, the truck module may provide the remote server the GNSS location data of the truck module and the truck sensor module. The truck module may determine the estimated distances between the truck module and the other devices connected so the short-range radio frequency network and provide the estimated distances to the remote server. The remote server may use this additional data to determine whether the truck is unpaired with the container and/or chassis.

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A method for dynamic pairing between a chassis module and a chassis sensor module mounted on a chassis and a container module mounted on a container, the method comprising:

detecting presence of the container using the chassis sensor module and in response, broadcasting a short-range polling signal;

establishing a wireless connection with the container module in response to the short-range polling signal;

obtaining global navigation satellite system (GNSS) data from one or more GNSS modules disposed on one or more of the chassis module, the chassis sensor module, or the container module;

determining an estimated distance between the chassis module and the container module; and transmitting the GNSS data and the estimated distance to a remote server, wherein, after the pairing between the chassis and the container and before removing the pairing, the remote server publishes a temporary pairing status based on updated GNSS data and an updated estimated distance and further stores a soft pairing based on the temporary pairing status.

2. The method of claim 1, wherein the chassis module and the chassis sensor module are coupled together.

3. The method of claim 1, wherein the chassis module and the chassis sensor module are wirelessly connected using short-range communication.

4. The method of claim 1, further comprising:

determining that the chassis has stopped; and detecting, in response to having determined that the chassis has stopped, presence of the container using the chassis sensor module.

5. The method of claim 4, further comprising:

sharing sensor data between the chassis module and the chassis sensor module in response to having detected the container using the chassis sensor module.

6. The method of claim 1, further comprising:

obtaining a primary chassis GNSS data in response to having determined that the chassis has stopped; and updating the remote server of the primary chassis GNSS data.

7. The method of claim 1, wherein the estimated distance is based on one or more of the GNSS data, short-range radio frequency phase measurement, round-trip timing, and Inverse Fast Fourier Transform.

8. The method of claim 1, wherein the wireless connection is based on one or more of a sub-GHz short range link, a Bluetooth low energy short range link, an ultra-wideband short range link, and a millimeter wave short range link.

9. The method of claim 1, wherein the estimated distance is based on channel sounding.

10. The method of claim 1, wherein the estimated distance is based on direction finding including one or more of an angle of arrival and an angle of departure.

11. The method of claim 1, wherein the estimated distance is determined based on sensor data from the chassis sensor module.

12. The method of claim 1, wherein the estimated distance is based on a Haversine distance calculation.

13. The method of claim 1, wherein the chassis sensor module includes one or more of a millimeter wave sensor, an ultrasonic sensor, a gyroscope, and an accelerometer.

14. The method of claim 1, further comprising:

determining, at the remote server, that the container is mounted to the chassis based on the GNSS data and the estimated distance; and storing the pairing, at the remote server, between the chassis and the container in response to the determination that the container is loaded on the chassis.

15. The method of claim 14, further comprising:

obtaining updated GNSS data and determining a first estimated distance between the chassis and the container;

sending the updated GNSS data and the first estimated distance to the remote server;

determining that the container is detached from the chassis based on the updated GNSS data and the first estimated distance at the remote server; and removing the pairing between the container and the chassis in response to the determination that the container is detached from the chassis.

16. The method of claim 15, further comprising:

obtaining the GNSS data of the container, and determining a second estimated distance between the chassis and the container;

sending the GNSS data of the container and the second estimated distance to the remote server; and determining that the container is detached from the chassis based on the updated GNSS data, the GNSS data of the container, the first estimated distance, and the second estimated distance at the remote server.

17. The method of claim 14, further comprising:

detecting a lack of presence of the container using the chassis sensor module and in response, sending a notification to the remote server.

18. The method of claim 17, further comprising:

obtaining updated GNSS data of the chassis and a first estimated distance in response to determining that the chassis has stopped; and sending the updated GNSS data, and the first estimated distance to the remote server.

19. A first device for dynamic pairing comprising:

a short-range communication module;

a long-range communication module;

a global navigation satellite system (GNSS) module;

a sensor module;

a processor coupled to the short-range communication module, the long-range communication module, the GNSS module, and the sensor module;

a memory coupled to the processor and storing executable instructions which, when executed by the processor, configure the processor to:

detect a presence of an asset using the sensor module and in response, broadcasting a short-range polling signal using the short-range communication module;

establish a wireless connection with a second device that is coupled to the asset in response to the short-range polling signal;

obtain GNSS data using the GNSS module;

determine an estimated distance between the first device and the second device; and transmit the GNSS data and the estimated distance to a remote server using the long-range communication module, wherein, after the pairing between the first device and the second device and before removing the pairing, the remote server publishes a temporary pairing status based on updated GNSS data and an updated estimated distance and further stores a soft pairing based on the temporary pairing status.

20. A non-transitory computer-readable storage medium comprising computer-executable instructions which, when executed, configure a processor to:

detect a presence of an asset and in response, broadcasting a short-range polling signal;

establish a wireless connection with a second device coupled to the asset in response to the short-range polling signal;

obtain global navigation satellite system (GNSS) data of at least one of a first device or the second device;

determine an estimated distance between the first device and the second device; and transmit the GNSS data and the estimated distance to a remote server, wherein, after a pairing between the first device and the second device and before removing the pairing, the remote server publishes a temporary pairing status based on updated GNSS data and an updated estimated distance and further stores a soft pairing based on the temporary pairing status.

* * * * *